United States Patent [19]

Eckler et al.

[11] 4,238,310
[45] Dec. 9, 1980

[54] APPARATUS FOR ELECTROLYTIC ETCHING

[75] Inventors: Thomas A. Eckler; Brian A. Manty, both of Lake Park, Fla.

[73] Assignee: United Technologies Corporation, Hartford, Conn.

[21] Appl. No.: 81,514

[22] Filed: Oct. 3, 1979

Related U.S. Application Data

[62] Division of Ser. No. 13,762, Feb. 21, 1979.

[51] Int. Cl.³ .............................................. C25F 7/00
[52] U.S. Cl. .................................. 204/252; 204/295; 204/DIG. 7
[58] Field of Search .................. 204/252, 295, DIG. 7

[56] References Cited

U.S. PATENT DOCUMENTS

| 1,519,572 | 12/1924 | Wolf | 204/DIG. 7 |
| 1,700,178 | 1/1929 | Porzel | 204/DIG. 7 |
| 3,749,653 | 7/1973 | Trzyna | 204/129.55 |

Primary Examiner—T. M. Tufariello
Attorney, Agent, or Firm—Charles G. Nessler

[57] ABSTRACT

An apparatus for electrolytically etching a precision groove pattern in a metal workpiece. A concave shaped shield having a small aperture contains the electrode. The shield diverts gases evolved at the upward facing workpiece away from the electrode while still allowing circulation of electrolyte about the electrode.

2 Claims, 4 Drawing Figures

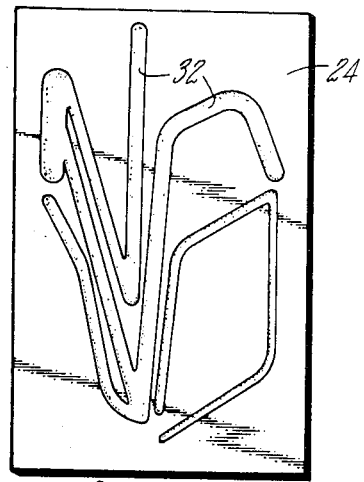
41°C 36V/17A
FIG. 3
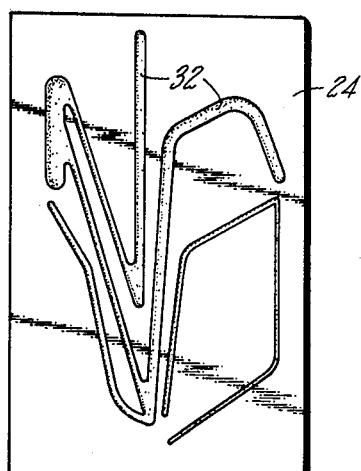
7°C 45V/15A
FIG. 4
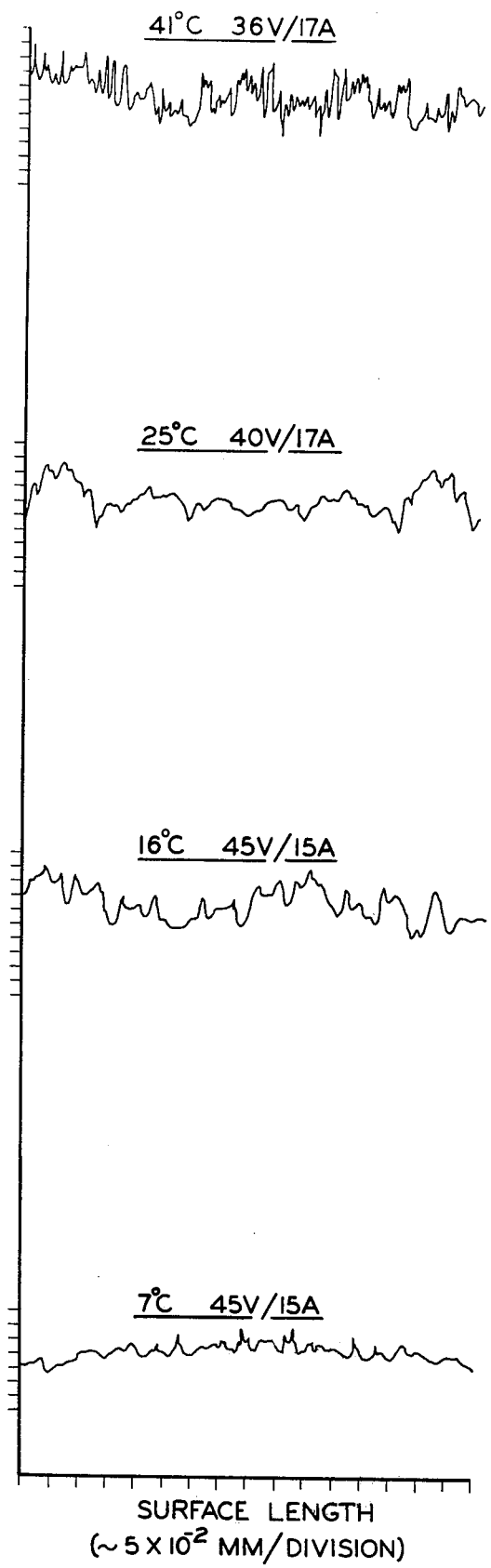

APPARATUS FOR ELECTROLYTIC ETCHING

This is a division of application Ser. No. 13,762 filed on Feb. 21, 1979.

BACKGROUND OF THE INVENTION

This invention relates to electrolytic etching and milling of metal alloys, particularly nickel superalloys.

Nickel superalloys, such as are used for high temperature service in gas turbines, are quite difficult to machine by conventional processes. Electrolytic etching is a particularly attractive method for removing small quantities of such metals, especially when small depressions or grooves are sought on the surface of a workpiece. Generally, electrolytic etching comprises the selective removal of portions of a workpiece by the combined action of an electric current and a corrodent. The conventional method of electrolytic etching involves immersing the workpiece in an electrolyte with an electrode and applying an electric potential so that the workpiece is anodic. Metals vary, of course, in their susceptibility to electrolytic etching. Many advanced nickel superalloys are by metallurgical design resistant to corrosive elements, including the acids normally used for electrolytic etching. They are complex, multiphase materials and it is often found that the different phases vary in their rates of removal. Conventional electrolytic etching of the more highly alloyed nickel superalloys is found to result in a rough and uneven surface coated with a substantial sludge residue of complex compounds of tungsten, titanium, and molybdenum. The conclusion of experience is that superalloys having substantial amounts of the foregoing elements, as a class, present the most electrolytic etching difficulty.

The most common application of electrolytic etching is the simple smoothing, or electropolishing, of a surface, by the removal of relatively small quantities, i.e., under 25 μ m of material from a surface. In other instances, small depressions or grooves are sought. To accomplish this, the workpiece is coated with an insulative material, or resist, in portions not to be removed. Generally, accurate definition is achieved when the depth of the depression is relatively slight. However, when it is sought to create depressions where the depth is appreciable, compared to the surface plane dimensions, it is found that the depressions are widened from the widths defined by the resist. Thus, for example, a groove of 1.0 mm width, as defined by a resist, when etched by a depth of 0.35 mm may be found to increase in width by as much as 60% to a width of 1.6 mm. Furthermore, the side walls of the groove will be tapered outwardly, e.g., the groove will be wider at its top than it is near its bottom. These lateral dimensional effects are characterized as "side etch." Adding to the undesired side etch effect, as grooves are cut deeper the previously mentioned unevenness and roughness are accentuated. Consequently, it is quite difficult within the state of the art to form grooves which have controllable surface finish, uniform depth, and consistent width.

Another problem frequently encountered in electrolytic etching occurs when a workpiece has separated etchable portions with varying surface areas: the larger areas will suffer greater material removal rates than the smaller areas. Therefore, in the absence of special techniques, uneven and uncontrolled depths will result at different locations in the workpiece.

Of course, some of the foregoing problems may be overcome by using various laboratory-type techniques, e.g., separately etching narrow grooves from wide grooves, using different sequences of electrolytes, and so forth, but these are not suited to the requirements of production of a multiplicity of parts. Therefore, there is a need for an electrolytic etching technique adapted to economically create uniform width, depth, and surface finish grooves of substantial depth, especially in nickel superalloys.

SUMMARY OF THE INVENTION

An object of the invention is improved electrochemical fabrication of difficult-to-machine metals. A more particular object is the efficient and repetitive formation of depressions or grooves having uniform depth and surface finish, even when the depressions have varying widths and are scattered irregularly across the surface of a high temperature nickel superalloy.

According to the method and apparatus of the invention, exposed surfaces of a resist coated nickel superalloy are electrolytically etched using periodically reversed current. The workpiece is placed in an electrolyte with the surfaces to be etched facing vertically upward, to allow the escape of gases liberated at any surface with minimum interference with etching at other locations. The electrode is placed above the workpiece.

According to the invention an aperture containing shield is interposed between the workpiece and the electrode. The shield aperture is made substantially smaller than the workpiece area containing exposed surfaces and produces a desirable current distribution on the workpiece. The shield is further adapted to prevent quantities of liberated gases from traveling toward the electrode and thereby interfering with the electrical current distribution. Further, the shield of the invention is adapted and located to allow free circulation of electrolyte, thereby avoiding localized heating in the region between the electrode and the workpiece. In a preferred embodiment the shield has a concave shape, the concavity being disposed toward the electrode, and the portion nearest the workpiece having the aperture. In a further preferred practice of the invention, thief portions are utilized on noncritical parts of the workpiece to further aid current distribution and the electrolyte is 10 volume percent HCl and water.

In contrast to much prior art wherein it is indicated that desired higher electrolyte temperatures are associated with higher efficiencies, in a preferred practice of the invention, the temperature of the electrolyte is maintained below 20° C., and even more preferably at about 7° C. In a preferred embodiment of the invention, the roughness of etched surfaces is controlled by variation of the electrolyte temperature. Lower temperatures are used to produce smoother surfaces; when higher roughness is desired, the electrolyte temperature is raised to 25° C. or higher.

Advantages of the invention are that disparate areas of superalloys can be etched to a precision heretofore difficult to achieve; depression depths may be made consistent in different areas of the workpiece even when grooves have different widths. Thus, manufacture of precision parts is greatly simplified. Furthermore, the surface finish of parts can be controlled without the necessity for secondary operations. This provides the opportunity for creating grooves and other etched depressions having different surface characteristics, e.g., varying fluid heat transfer rates. In addition, good rates of production are achievable and good efficiency of electrical utilization is achieved.

BRIEF DESCRIPTION OF THE DRAWING

FIG. 2 is a graphical representation of electrolytic etching parameters and the surface roughness obtained in grooves.

FIG. 3 is a planar view of grooves etched in the surface of a nickel superalloy workpiece.

FIG. 4 is a view similar to that of FIG. 3 but with etching parameters which provide less side etch.

DESCRIPTION OF THE PREFERRED EMBODIMENT

Figure 1:
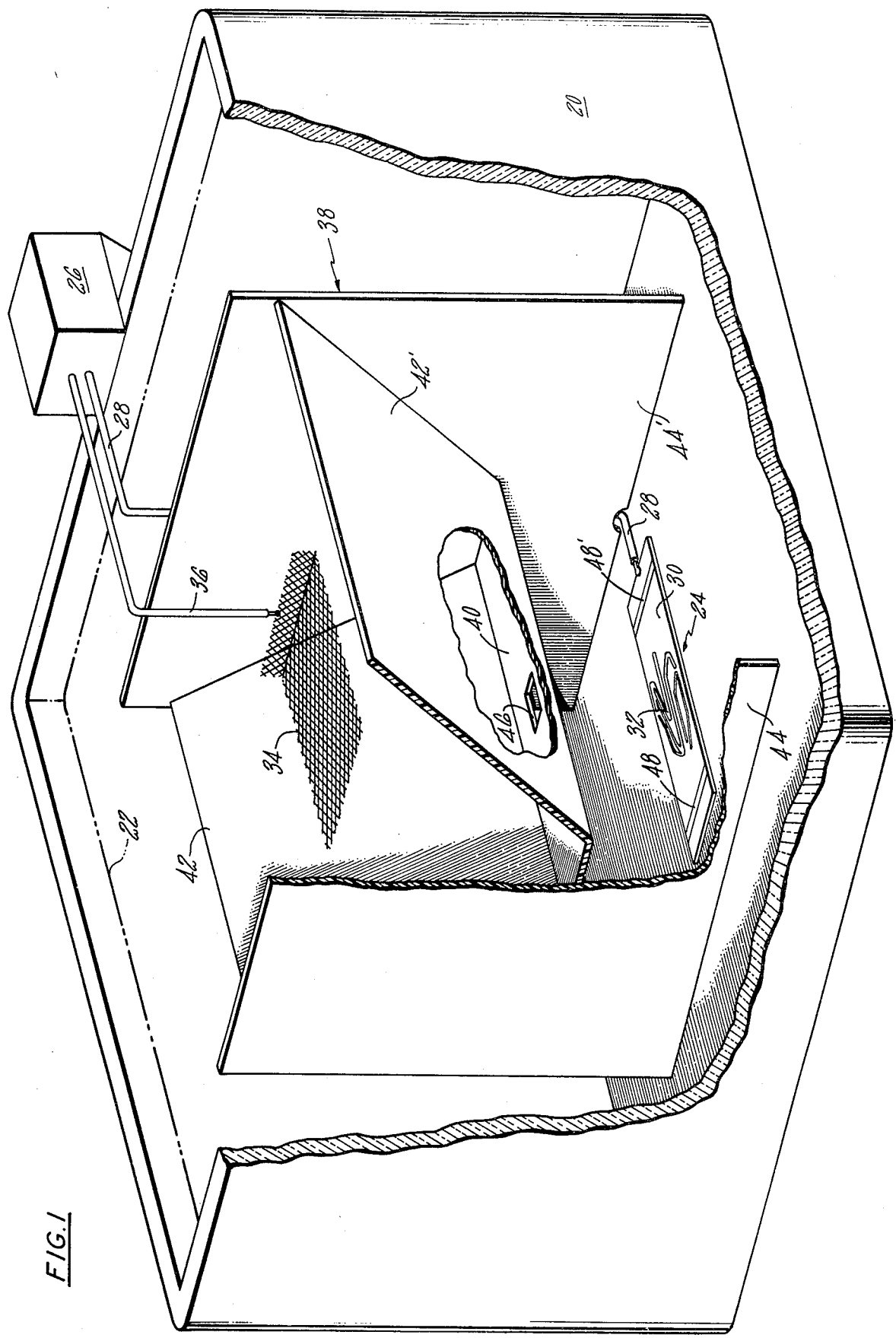
FIG. 1 is a general view of the apparatus for electrolytic etching.

As will be evident from the following discussion, the apparatus and method of the invention are applicable to various metal alloys and configurations. Nonetheless, the preferred embodiment is described in terms of electrolytically etching grooves of about 300 μm depth in a 1.5 mm thick by 25 mm wide by 100 mm long plate of nickel superalloys such as the commercial alloys IN-625, IN-600, IN-100 and MAR M-200.

FIG. 1 shows an apparatus for electrolytic etching according to the invention. A nonconductive and acid resistive vessel 20 of about two liter capacity is filled with liquid electrolyte to a level 22 near its top. The workpiece 24 rests on the bottom of the vessel and is connected to the power supply 26 by a conductor 28. The workpiece is coated with a resist 30, which by its absence in certain areas defines the pattern of uneven width but uniform depth grooves 32 which is sought on the workpiece. This pattern is more clearly shown in FIG. 4. The workpiece is disposed in the tank so that the surfaces to be etched are facing vertically up. An electrode 34 is mounted vertically above the workpiece at a distance of about 100 mm. The electrode, preferably made of a material such as platinized titanium mesh in a rectangular platelike shape, is connected to the power supply 26 by conductor 36. Interposed between the electrode and the workpiece is a shield 38, made of a nonconducting material such as a methacrylate thermoplastic. The shield is comprised of a base plate 40 inclined side plates 42 and 42' and vertical side plates 44 and 44', all the elements being integrally joined. The base plate and side plates define a concave shaped structure within which the electrode 34 is contained. The shield is supported in its fixed position by extensions of the plates 44 and 44' which rest on the bottom of the tank. Other obvious means could be used to support the shield. The base plate 40 contains an aperture 46 which is approximately centered above the workpiece at a distance of about 55 mm from it. It will be noted that the liquid level is above the top, or open concave end, of the shield. Nonetheless, the only direct path for current flowing between the electrode 34 and workpiece 24 is through the aperture 46.

Discussing now the general mode of operation of the apparatus, the vessel 20 is filled with an electrolyte. Electrolyte composition and concentration will vary with the metal being etched, according to well known art. For nickel superalloys, aqueous solutions of various acids, such as HCl and HNO$_3$, and aqueous solutions of salts, such as NaCl, are usable. As noted below HCl is preferred. Before placing the workpiece in the electrolyte it is prepared in the following conventional manner: as necessary, degreasing is followed by other cleaning and drying steps to remove all contaminants; then a resist such as Waycoat S.C. Resist (Phillip A. Hunt Chemical Corporation, Palisades Park, N.J.) is applied to the surface of the workpiece and selectively removed, using common techniques and the manufacturer's instructions, to produce a workpiece wherein the areas which are to be etched are free from the resist. The workpiece is then connected with the conductor 28 and placed in position in the bottom of the vessel. The power supply 26 is a source of electric potential and current of sufficient capacity for the electrode workpiece distance, electrolyte, surface area being etched, and speed of removal which is sought. In the preferred practice of the invention described herein a power supply of 50 volts dc and 25 amperes capacity is adequate. The power supply also has the capability of periodically reversing the direction of the current flow. The workpiece is also optionally provided with integral thief portions 48 and 48'. These are areas free of resist which aid in balancing the distribution of current at the workpiece.

The operation of the apparatus will now be described specifically for the formation of grooves in a modified nickel alloy MAR M-200 which has the composition by weight percent of 9 chromium, 10 cobalt, 12 tungsten, 5 aluminum, 2 titanium, 2 hafnium, 1 columbium and balance nickel. The preferred electrolyte is a 10 volume percent HCl aqueous solution having a specific gravity of 1.047. The concentration of HCl may vary, at least over the range of 8–12 percent. If a constant anodic potential is applied to the workpiece, insoluble products are formed on the surface. This is believed to be due to local chemical reactions of the following type:

$$Ni \rightarrow Ni^{++} \tag{1}$$

$$2H_2O \rightarrow 2OH^- + O_2 \tag{2}$$

$$Ni^{++} + 2OH^- \rightarrow Ni(OH)_2 \tag{3}$$

Thus, metal ions are dissolved (Equation 1); the production of a hydroxide ion due to the breakdown of water (Equation 2) raises the pH locally, which in turn results in the precipitation of metal hydroxides (Equation 3) which constitute the sludge. The precipitated hydroxides are not conductive and, being on the workpiece surfaces, will interfere with uniform etching. General unevenness and a ridge running down the length of a groove will result. To overcome this, the current is reversed, e.g., the workpiece is made cathodic periodically. This results in massive evolution of hydrogen at the workpiece which scrubs its surface and removes the insoluble material collected in the passages. Tests with MAR M-200 and the 10% HCl electrolyte have shown that the preferred workpiece potential versus time cycle comprises 2.5 seconds anodic alternated with 5 seconds cathodic.

As was indicated, a serious problem with electrolytic etching is the uneven milling which is caused by higher primary current densities at larger exposed areas, compared to smaller exposed areas, and at the edges of the workpiece. A common approach for balancing current densities is to use thieves, which are normally extraneous pieces of metal disposed around and electrically connected to the workpiece. Of course, the disadvantage of thieves is that they increase the total current which must be applied by the electrode, not only creating an inefficiency and unnecessary and undesirable heating of the electrolyte, but also at times exceeding the limits of the power supply. As is disclosed below, a combination of thieves and shield was found most suitable for the workpiece of the preferred embodiment. The approach was to use selected portions of the workpiece, e.g., surfaces on which dimensions are not critical, or surfaces on portions of the workpiece which can be discarded in subsequent fabrication.

Control of the variation in current density at the workpiece is quite critical to achieving uniform etching. The current density at a point on the workpiece is a function of primary current distribution, which is dependent on the general geometry of the apparatus, and the secondary current distribution which is related to local effects, such polarization. The shield 38 with its aperture 46 has a substantial effect on the current distribution at the workpiece. One concept is that since the current is forced to pass through the aperture 46, the aperture acts as a virtual electrode. Experiments with the particular workpiece described here have shown that an aperture of 5×8 mm is suitable. The exact aperture and lateral and vertical position with respect to the workpiece is subject to variation, according to the pattern of grooves which are being produced on the workpiece.

As was indicated, it is necessary to use periodically reversed current to eliminate the accumulation of sludge and other byproducts on the workpiece. This results in the evolution of substantial quantities of gases at the workpiece. The reason the workpiece is disposed with the etched surface facing vertically up is to allow the ready escape of these gases without having them interfere with etching as they might if they flowed transversely across the surface of the workpiece. In like fashion, passage of the gases towards the electrode from the workpiece results in gas polarization, that is, it will undesirably decrease the effective cross section of the electrical path between the electrode and workpiece. Therefore, the shield of the invention is shaped to contain and protect the electrode from the gases. Except for those gases which rise directly from the workpiece toward the aperture 46, gases will be intercepted by the shield and deflected laterally by its shape, whereupon they will continue to rise to be liberated at the surface of the electrolyte at the periphery of the shield.

In the description of the apparatus, it was stated that the shield was shaped and positioned within the electrolyte so that there was electrolyte above at least a portion of its open concave end or top. Current passing between the electrode and workpiece will naturally resistively heat the electrolyte and thereby undesirably alter the electrolytic etching conditions. To avoid this, the shield is shaped and positioned so that free circulation of electrolyte within the concavity of the shield is possible. Electrolyte which is heated within the shield will convectively rise to the top of the shield and pass over its edge, being replaced by the inflow of cooler electrolyte through the aperture. In the practice of the invention thus far, it has not been found necessary to use mechanical agitation, due to the convective circulation and activity of evolved gases. However, mechanical agitation could be used in other instances to enhance circulation of the electrolyte. Similarly, it will be apparent that other shapes of the shield than that described would be equally suited to protect the electrode-workpiece space from evolved workpiece gases and at the same time allow the free circulation of electrolyte.

A substantial and potentially useful effect of temperature of the electrolyte near the workpiece on the quality of grooves has been discovered. Heretofore, the general practice has been to operate at room temperature (20° C.) or higher, as the bath will naturally heat during etching. But, it was found that the temperature of the electrolyte affects both the roughness on the etched surface and the degree of side etch. Side etch is defined and quantified in a percent as:

$$\frac{\text{Final Width minus Initial Width}}{2 \times \text{Depth}} \times 100$$

And surface roughness is measured with a device, such as a profilometer, it is the relative change in surface height to the mean as a probe passes across the length of a surface. To evaluate the effects of temperature, grooves from about 0.5 to 2 mm wide were etched, in a pattern similar to that shown in FIGS. 3 and 4. Nominally, the same current and voltage were used. The test conditions used in evaluating the temperature effects are shown in Table I.

TABLE I

| | Effect of Electrolyte Temperature on Average Groove Depth and Side Etch | | | |
|---|---|---|---|---|
| Potential Volts | Current amp | Temp. °C. | Depth $10^{-2}$mm | Side Etch % |
| 45 | 15 | 7 | 25.7 | 51 |
| 45 | 15 | 16 | 30.5 | 63 |
| 40 | 17 | 25 | 35.3 | 83 |
| 37 | 17 | 41 | 32.0 | 181 |

FIG. 2 indicates that temperatures lower than 20° C. substantially reduce surface roughness. It was found that the most preferred temperature for MAR M-200 is 7±1° C. It can be seen further from the data in Table I that the percent side etch rises dramatically with increasing temperature. This effect of side etch is further illustrated in FIGS. 3 and 4 where the widths of grooves 32 produced in identical resist-coated workpieces are substantially reduced when the temperature is lowered from 41° C. to 7° C. A low percentage of side etch is indicative of a process capable of producing narrow grooves of greater depth to width ratio and less sidewall taper. Consequently, not only can finer grooves be manufactured, but less compensation need be made in the resist pattern to achieve a desired groove pattern in a finished article. Conventional means are usable for maintaining the temperature of the electrolyte within the desired range. These include cooling coils and recirculating pumps and heat exchangers.

Although this invention has been shown and described with respect to a preferred embodiment, it will be understood by those skilled in this art that various changes in form and detail thereof may be made without departing from the spirit and scope of the claimed invention.

Having thus described a typical embodiment of our invention, that which we claim as new and desire to secure by Letters Patent of the United States is:

1. In apparatus for electrolytically etching a precision groove pattern in a metal workpiece using a vessel, an electrode and means for applying alternating electric potential between the electrode and the workpiece, the improvement comprising:

a shield of non-conductive material, capable of being interposed between the workpiece and the electrode, having:
- a horizontally disposed base plate containing an aperture, the aperture having small dimensions compared to the base plate and the workpiece,
- a concave shape of sufficient dimension to contain the electrode, the shape being adapted to divert passage toward the electrode of gases generated at the workpiece,
- a shape which allows circulation of electrolyte through the aperture, to avoid stagnation and heating of electrolyte contained within the concavity of the shield, means for fixedly holding the shield between the electrode and the workpiece, and means for holding the electrode within the shield concavity, so that a current distribution is achieved at the workpiece which promotes uniformity of depth of etching.

2. The apparatus of claim 1 further comprising means for maintaining the electrolyte at a temperature below 20° C.

* * * * *